Patented Oct. 19, 1948

2,451,501

UNITED STATES PATENT OFFICE 2,451,501

SPECULAR REFLECTOMETER

William Liben, New York, N. Y.

Application September 21, 1944, Serial No. 555,158

1 Claim. (Cl. 88—14)

(Granted under the act of March 3, 1883, as amended April 30, 1928; 370 O. G. 757)

The invention described herein may be manufactured and used by or for the Government for governmental purposes, without payment to me of any royalty thereon.

This invention relates to a specular reflectometer and the primary object thereof is to provide a device of this character for measuring the reflectance of flat and curved surfaces used in searchlights and the like.

Another object of the invention is to provide a specular reflectometer adapted to measure reflections at normal incidence.

Another object of the invention is to provide a specular reflectometer consisting of few parts arranged in a simple manner, and which is rapid in use and not liable to get out of order.

Briefly stated, according to the invention, the reflectance of a flat or curved piece of glass or other reflecting surface is measured by causing light to pass through a lens, which collimates the light and causes a parallel beam to be projected onto a semi-transparent mirror arranged at an angle of forty-five degrees with respect to the collimated light beam. The mirror is adapted to reflect and transmit substantially equal parts of the light beam incident upon it, one of the parts of the light beam being reflected into a light trap and another part being transmitted through the mirror to a reflecting surface. The light transmitted to the surface is reflected back again incident upon the mirror, where part of the light beam is reflected to another lens, which last-mentioned lens projects the light beam into a box coated on its interior with a light diffusing substance, such as magnesium oxide. The light rays within the box strike the magnesium oxide coated walls of the box, and from the walls of the box the light rays are scattered so that a portion strikes a photoelectric cell which is connected in circuit with a potentiometer and meter. The potentiometer is adapted to be adjusted to cause the meter to register the reflecting property of a standard sample of known reflectance, after which a reflector member of unknown reflectance is substituted for the sample and a meter reading taken of the reflection of the member. The relative meter readings will equal the relative reflectances of the sample and the member, whereby the reflection of the member may be calculated.

With the above and other objects and advantages in view the invention consists of certain features of construction and operation of parts which will hereinafter be described and shown in the accompanying drawings in which.

Figures 1, 2:
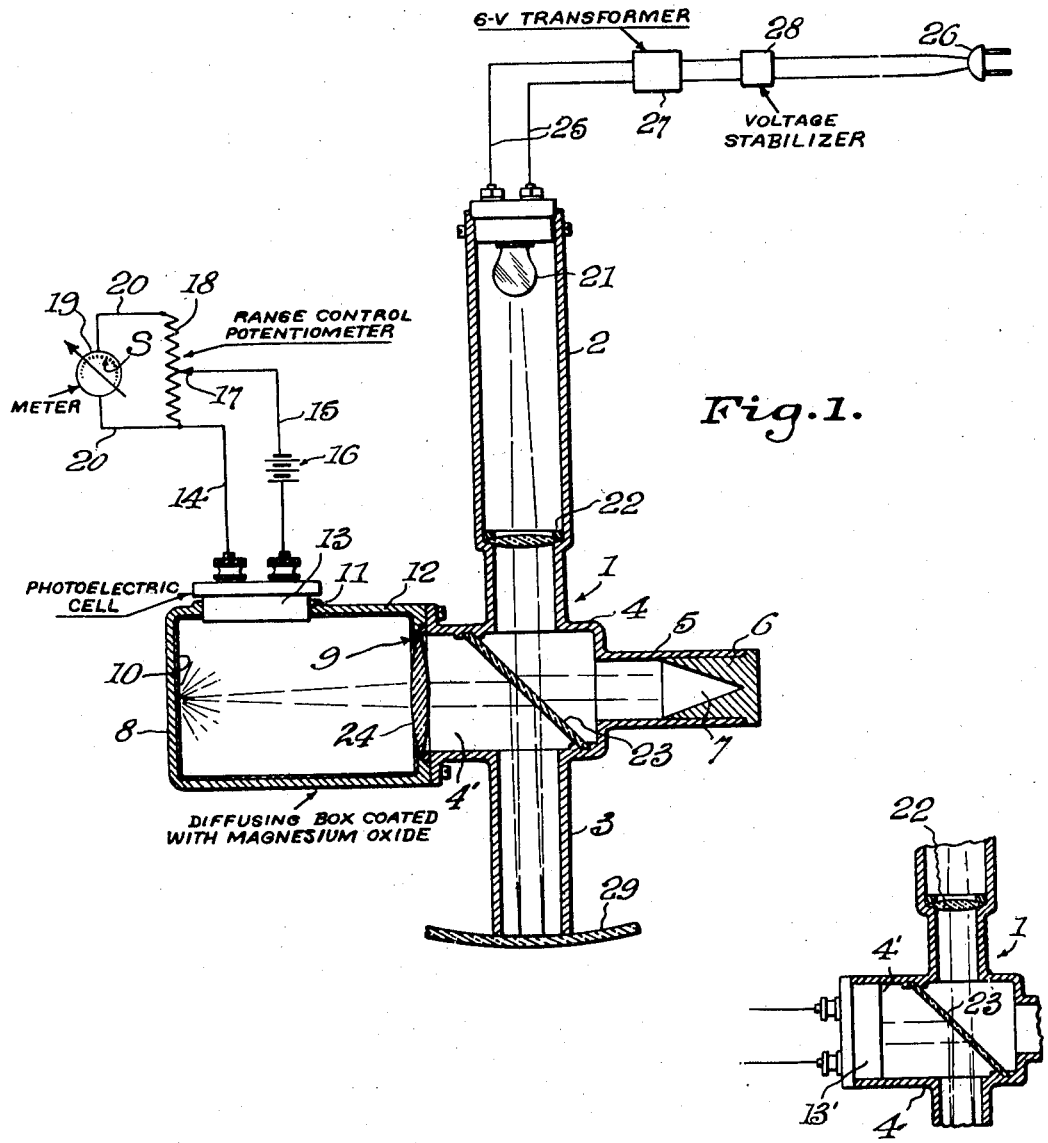
Figure 1 is a vertical sectional view of the invention showing the general arrangement thereof in relation to a curved surface and including a light diffusion box having a photoelectric cell mounted thereon, with electric circuits having electrical responsive elements connected therein used in carrying out the invention.
Figure 2 is a fragmentary sectional view of a modified form of the invention with a photoelectric cell arranged thereon in a different manner than in Figure 1.

Referring more specifically to the drawings, there is shown, in Fig. 1, a housing indicated generally by 1 and including vertically extending upper and lower tubular portions 2 and 3, respectively, and an enlarged horizontally arranged portion 4 having an opening 4' at one end and a reduced tubular extension 5 projecting outwardly from another end thereof, with the outer end of the extension 5 closed by a plug 6 having a black cone-shaped light trap 7 formed on the inner end of the plug. A horizontally extending box 8 having an opening 9 on one end is suitably mounted on the other end of the housing portion 4, with the opening 9 in the box 8 being in alignment with the opening 4' in the housing portion 4. The box 8 which is larger in diameter than the housing portion 4 is coated on its interior with any suitable light diffusing material, such as magnesium oxide and has an aperture 11 formed in its upper wall 12 adjacent to the outer end of the box, said aperture 11 being provided for receiving a photoelectric cell 13, with the inner end of the cell 13 facing the interior of the box 8. One electrode of the photoelectric cell 13 is connected by a conductor 14 to one end of a potentiometer, while the other electrode of the cell 13 is connected by a conductor 15 through a battery 16 with a movable contact 17 adapted to be actuated along the resistance 18 of the potentiometer. A meter 19 is connected by conductors 20 in series with the potentiometer.

The optical system used in carrying out the invention includes a light source in the form of a lamp 21 mounted in the upper end of the tubular housing portion 2, also a collimating lens 22 mounted in the tubular housing portion 2 adjacent to the lower end thereof and above the housing portion 4, a semi-transparent mirror 23 mounted within the housing portion 4 and at an angle of forty-five degrees with respect to the housing portions 2 and 3, tubular extension 5 and the box 8 and a vertically arranged lens 24 mounted within the opening 9 of the box 8. The lamp 21 is connected by leads 25 with an electric plug 26 adapted to be connected with a source of electrical supply (not shown) for supplying current to the lamp and a suitable transformer 27 and voltage stabilizer 28 as shown may be connected in circuit with the leads 26.

In Fig. 2, the lens 24 and box 8 are eliminated and a photoelectric cell 13' is arranged in the opening 4' in the housing portion 4, whereby the light rays from the mirror 23 are directly reflected through the opening 4' onto the photoelectric cell.

In using the device of Fig. 1, for measuring the reflectance of the curved surface 29, the light beam from the lamp 21 passes through the lens 22, which lens 22 collimates the beam, so that a parallel ray beam strikes the semi-transparent mirror 23, which reflects substantially half of the light rays of the beam incident upon it, into the extension 5 where it is absorbed by the light trap 7 and the other half of the beam is transmitted through the mirror 23 onto the reflecting surface 29 which is to be tested. The last-mentioned part of the beam is then reflected from the surface 29 back onto the mirror 23, which in turn reflects the light rays of the beam onto the lens 24 that directs the rays into the box 8. The rays, upon striking the magnesium oxide coated inner surfaces 10 of the box 8, are caused to spread out thereby illuminating the interior of the box and exposing the photoelectric cell 13 to the rays. The photoelectric cell 13 being exposed to the rays is thereby energized thus completing the electric circuit through the conductors 14 and 15, battery 16, the resistance 18 of the potentiometer, the conductors 20 and the meter 19.

Prior to measuring the reflectance of surface 29, a standard sample of known reflection (not shown) is first measured by moving contact 17 of conductor 15 along the resistance 18 of the potentiometer, until the value indicated on meter 19 equals the known reflectance of the standard sample. The surface 29 is then substituted for the standard sample whereby a different value is registered on the meter 19. The relative meter readings of the known reflection of the standard sample and the unknown reflection of the surface 29 provide data with which the reflectance of the surface 29 may be calculated. If the scale of the meter 19 has a hundred divisions, the scale readings of the meter may be adjusted so that the standard produces a reading of 100, whereby the instrument would become a direct reading reflectometer.

It will thus be seen that there has herein been provided a novel and efficient form of specular reflectometer which is well adapted for the purpose intended. Even though there has herein been shown and described the invention as comprising certain features of construction and operation of parts, it is nevertheless to be understood that various changes may be made therein, if the changes do not depart from the spirit and scope of the appended claim.

Having thus described my invention, what I claim as new and wish to secure by Letters Patent is:

Apparatus for measuring the light reflectance from reflective surfaces, which comprises a housing, a mounting in the housing forming a closure for an end of the housing, a source of light mounted on the closure for illuminating the interior of the housing, the said housing having an opposite open end adapted to engage the reflective surface of a test object, a collimating lens mounted in the housing intermediate the ends for receiving light from the said source, a pair of oppositely directed arms opening into the housing intermediate the collimating lens and the test surface, the said arms forming a pair of oppositely directed chambers, one of which chambers is a light trap chamber, the other of which chambers is a light-energizing chamber, the light trap chamber being closed by an end closure member provided with an interiorly disposed concave conical recess having a light absorptive surface thereon, a semi-transparent mirror mounted in the housing intermediate the openings of the said chambers into the housing, the said semi-transparent mirror being adapted to reflect a portion of collimated light incident thereon from the light source into the light trap chamber for absorption therein on the concave conical light-absorbing surface while passing the remaining amount of the incident collimated light to the test surface for reflection therefrom back to the mirror, light-responsive-means mounted in the light-energizing chamber, and a focusing lens mounted in the light-energizing chamber adjacent to the opening thereof into the housing, the said focusing lens having a focal length substantially equal to the distance from the lens to the end of the chamber for transmitting and focusing the light reflected from the test surface and thence from the mirror against the end of the light-energizing chamber, the said light-responsive means receiving light transmitted by the focusing lens and becoming energized by the said light whereby the reflectance of the test surface may be determined.

WILLIAM LIBEN.

REFERENCES CITED

The following references are of record in the file of this patent:

UNITED STATES PATENTS

| Number | Name | Date |
| --- | --- | --- |
| 2,046,714 | Wilson et al. | July 7, 1936 |
| 2,254,062 | Devol | Aug. 26, 1941 |
| 2,280,993 | Barnes | Apr. 28, 1942 |
| 2,287,808 | Lehde | June 30, 1942 |
| 2,341,422 | Bubb | Feb. 8, 1944 |
| 2,405,483 | Abrams | Aug. 6, 1946 |

FOREIGN PATENTS

| Number | Country | Date |
| --- | --- | --- |
| 445,009 | Great Britain | Apr. 1, 1936 |